United States Patent [19]
Walker et al.

[11] Patent Number: 5,252,946
[45] Date of Patent: Oct. 12, 1993

[54] METHOD OF DETECTING A DEFLATED TIRE ON A VEHICLE

[75] Inventors: John C. Walker, Coldfield; Lavinder S. Rehal, Coventry, both of Great Britain

[73] Assignee: Sumitomo Rubber Industries Limited, Hyogo, Japan

[21] Appl. No.: 802,215

[22] Filed: Dec. 4, 1991

[30] Foreign Application Priority Data

Dec. 6, 1990 [GB] United Kingdom ................ 9026558

[51] Int. Cl.$^5$ ............................................. B60C 23/00
[52] U.S. Cl. ................................... 340/444; 73/146.2; 364/565
[58] Field of Search ................. 73/146, 146.2, 146.3, 73/146.4, 146.5; 364/558, 565; 340/442, 444

[56] References Cited

U.S. PATENT DOCUMENTS

| | | | |
|---|---|---|---|
| 4,694,409 | 9/1987 | Lehman | 73/146.8 |
| 4,695,823 | 9/1987 | Vernon | 73/146.8 |
| 4,777,611 | 10/1988 | Tashiro et al. | 364/565 |
| 4,876,528 | 10/1989 | Walker et al. | 340/444 |

FOREIGN PATENT DOCUMENTS

| | | |
|---|---|---|
| 0291217 | 11/1988 | European Pat. Off. . |
| 0441599 | 8/1991 | European Pat. Off. . |
| 0441600 | 8/1991 | European Pat. Off. . |
| 0466535 | 1/1992 | European Pat. Off. . |
| 2568519 | 2/1986 | France . |

*Primary Examiner*—Donald O. Woodiel
*Attorney, Agent, or Firm*—Birch, Stewart, Kolasch & Birch

[57] ABSTRACT

A method of detecting a deflated tire on a vehicle by comparing the rolling radii of the tires by comparing angular velocity signals from wheel speed sensors at each wheel comprising the steps of calculating the factors $$\frac{C1+C2}{C3+C4} \quad \frac{C1+C3}{C2+C4} \quad \frac{C1+C4}{C2+C3}$$

where C1, C2, C3 and C4 are the signals for the speeds of the front left-hand, front right-hand, rear left-hand and rear right-hand wheels of the vehicle, monitoring these factors and if the value of one or more factor becomes greater than 1.0005 or less than 0.9995, producing a warning signal to indicate that a tire has become partially or completely deflated.

8 Claims, 1 Drawing Sheet

METHOD OF DETECTING A DEFLATED TIRE ON A VEHICLE

This invention relates to a method of detecting a deflated tire on a vehicle suitable for cars, trucks and the like, and particularly to the system disclosed in for example French Patent Publication No. 2568519 and European Patent Publication No. 291217.

These Patents proposed using the wheel speed signals from the vehicle wheels such as for example a multi-pulse signal as used for ABS equipment or a single-pulse signal for each rotation of each wheel. They compare the speed derived signals of the wheels on a diagonal sum basis by comparing the sums of the speeds of the diagonally opposed pairs of wheels and this is monitored locking for a difference above a critical level. In the case of the French Patent, error problems due to cornering and acceleration etc. were allowed for by making the period of checking a very long distance or time so that the effect of cornering and braking was averaged out. In the case of the European Patent Publication No. 291 217, the system first calculated the lateral and longitudinal accelerations of the vehicle and set strict limits in which the system was inhibited thereby avoiding false signals. This system went on to look at the speed of each wheel compared with the mean of the set of wheels to detect which of the four wheels was in fact punctured. However the system was not able to reliably detect two simultaneous punctures because these may give the same effect as cornering or braking or accelerating depending which two are deflated and therefore resulted in inhibition of the system.

SUMMARY OF THE INVENTION

It is an object of the present invention to add to the prior art systems using diagonal sum comparisons further features allowing correct identification of punctures including two simultaneous punctures.

According to one aspect of the present invention, a method of defecting a deflated tire on a vehicle by comparing the rolling radii of the tires by means of comparing angular velocity signals from wheel speed sensors at each wheel characterised by calculating the factors $$\frac{C1 + C2}{C3 + C4} \quad \frac{C1 + C3}{C2 + C4} \quad \frac{C1 + C4}{C2 + C3}$$

where C1, C2, C3 and C4 are the signals for the speeds of the front left-hand, front right-hand, rear left-hand and rear right-hand wheels of the vehicle, monitoring these factors and if the value of one or more factor becomes greater than 1.0005 or less than 0.9995 producing a warning signal to indicate that a tire has become partially or completely deflated.

More preferably, a warning signal is indicated when the value of one of the factors becomes greater than 1.001 or less than 0.999. In each case the other factors remain substantially one, the small variations being due to noise in the signals.

Preferably, a warning signal is only given after two or more, or more preferably five successive time periods during which monitoring shows that one or more of the factors is greater than the specified limit, thereby avoiding potential false signals.

The system may also determine which wheel or pair of wheels is deflated by means of comparing all the factors with a Truth Table as follows:

| $\frac{C1 + C2}{C3 + C4}$ | $\frac{C1 + C3}{C2 + C4}$ | $\frac{C1 + C4}{C2 + C3}$ | Tire(s) Deflated |
|---|---|---|---|
| +ve | +ve | +ve | 1 |
| +ve | −ve | −ve | 2 |
| −ve | +ve | −ve | 3 |
| −ve | −ve | +ve | 4 |
| +ve | 0 | 0 | 1,2 |
| 0 | +ve | 0 | 1,3 |
| 0 | 0 | +ve | 1,4 |
| 0 | 0 | −ve | 2,3 |
| 0 | −ve | 0 | 2,4 |
| −ve | 0 | 0 | 3,4 |
| +ve | +ve | −ve | 1,2,3 |
| −ve | −ve | −ve | 2,3,4 |
| −ve | +ve | +ve | 3,4,1 |
| +ve | −ve | +ve | 4,1,2 |

In this Table +ve means the factor is greater than 1.0005, −ve means the factor is less than 0.9995 and zero means that the factor is substantially one.

To ensure that false signals are not given, it is preferable to correct the wheel speed signals to allow for different tire sizes and other variations by calculating constants for correcting the speed signals by running the vehicle in a straight line at a constant speed.

Preferably, the signals comprise multi-pulse electrical signals from each wheel of the type used for an anti-lock braking system. Alternatively the signals may comprise a single electrical pulse for each rotation of each wheel and the time period between successive pulses is used for the angular velocity value.

Further aspects of the present invention will become apparent from the following description by way of example only of one embodiment.

BRIEF DESCRIPTION OF THE DRAWING

The present invention will become more fully understood from the detailed description given hereinbelow and the accompanying drawings which are given by way of illustration only, and thus are not limitative of ther present invention, and wherein.

DETAILED DESCRIPTION OF THE PREFERRED EMBODIMENTS

Figure 1:
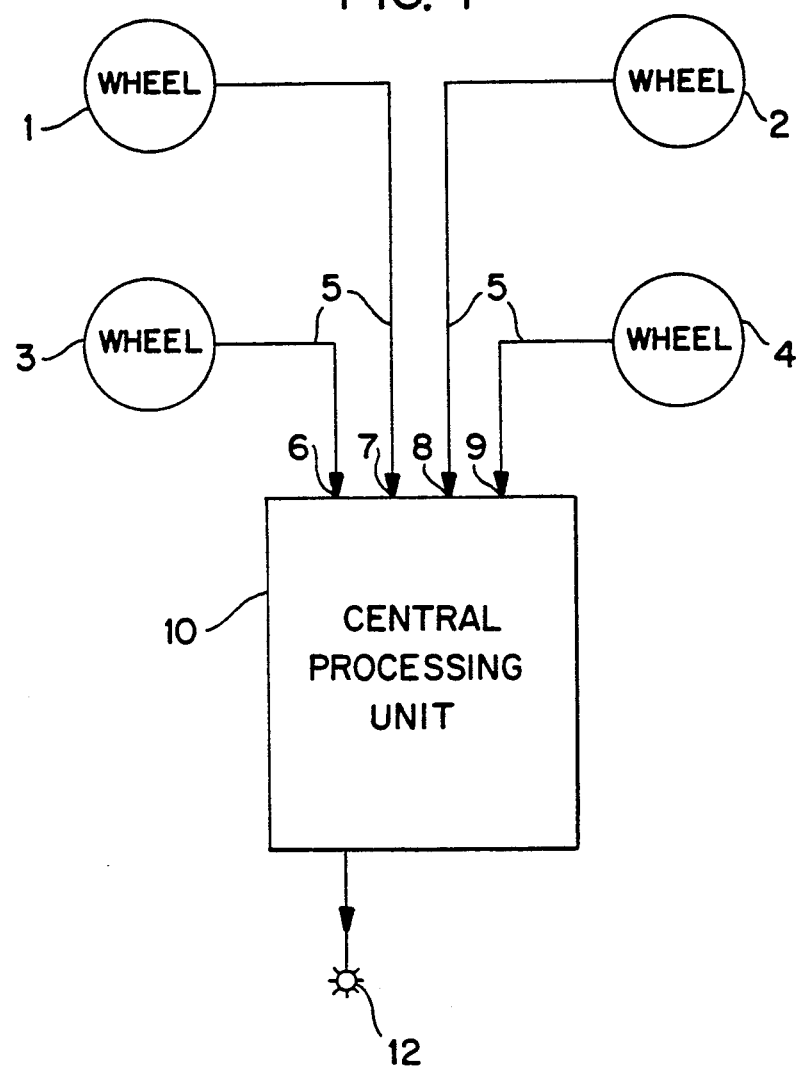
FIG. 1 is a schematic diagrammatic drawing showing a deflation warning device for a car with four wheels.

The device of the present invention comprises a central computer or processor 9 which takes the speed signals from each of the four wheels 1,2,3 and 4 of the car through cables 5 to provide input 6, 7, 8 and 9 to the central processing unit. These signals can be the usual multi-pulse (i.e. 48 or 96 pulses per wheel), such as the electrical signals which are used for anti-lock braking systems of the electronic type or may instead be a single pulse per wheel generated by a magnet attached to the wheel or brake disc and a stationary pick-up attached to the suspension. The first type of signal is a digital signal and the second is a single pulse signal but both have the ability to generate signal proportional to the wheel speed. In the latter case, this signal is most conveniently generated by means of the time for a single rotation.

In the case of the single pulse system, it is necessary to set up a computer derived speed signal generating system for each of the wheels so that the true speeds at any single instant of all four wheels can be determined. Such a process is described in our co-pending UK Patent Application No. 9002925.7.

The four signals are taken to the computer or central processing unit and converted to four separate signals directly proportional to the speed of each of the four wheels. A compensation to allow for variations between the different tires of a vehicle because in fact they are tolerances on tires and other simple car factors such as front and rear weight variation which may cause slight differences in the rolling radius of the tires on the vehicle can be achieved by means of a precalibration to determine constants used to correct the speeds. This is carried out at a constant speed in straight running but is not a particularly important part of the present invention and further detail will not be here given.

The four wheel speed signals C1, C2, C3 and C4 are those calculated by the first stages of the computer. The computer then calculates the factors $$\frac{C1 + C2}{C3 + C4} \quad \frac{C1 + C3}{C2 + C4} \quad \frac{C1 + C4}{C2 + C3}$$

These factors are stored. As long as the four tires of the vehicle are substantially at the same pressure these factors all remain substantially at one although there is some small variation usually less than 0.0004 due to noise from the electrical signals.

If one or more of these factors exceeds 1.0005 or is less than 0.9995 in value, then one of the tires has a relative pressure deflation of 0.3 bar or more difference to the others. The device then produces a warning signal which indicates on the dashboard by illuminating a light 12 that a tire has been partially or completely deflated. To avoid false errors this signal does not in fact produce a warning signal until five successive time periods of five seconds have given a constant signal greater than 1.0005 or less than 0.9995.

The signal level for a warning may also be set at greater than 1.001 or less than 0.999 which is equivalent to 0.6 bar pressure loss in a single tire.

The computer also compares the factors calculated with the following Truth Table which allows it to determine whether tire 1, tire 2, tire 3, tire 4 or indeed combinations of two or three of these tires are deflated.

| $\frac{C1 + C2}{C3 + C4}$ | $\frac{C1 + C3}{C2 + C4}$ | $\frac{C1 + C4}{C2 + C3}$ | Tire(s) Deflated |
|---|---|---|---|
| +ve | +ve | +ve | 1 |
| +ve | −ve | −ve | 2 |
| −ve | +ve | −ve | 3 |
| −ve | −ve | +ve | 4 |
| +ve | 0 | 0 | 1,2 |
| 0 | +ve | 0 | 1,3 |
| 0 | 0 | +ve | 1,4 |
| 0 | 0 | −ve | 2,3 |
| 0 | −ve | 0 | 2,4 |
| −ve | 0 | 0 | 3,4 |
| +ve | +ve | −ve | 1,2,3 |
| −ve | −ve | −ve | 2,3,4 |
| −ve | +ve | +ve | 3,4,1 |
| +ve | −ve | +ve | 4,1,2 |

In this Table +ve means the factor is greater than 1.0005, −ve means the factor is less than 0.9995 and 0 means that the factor is substantially one.

Accordingly, an indication can be given after the initial deflation warning as to which particular tire(s) is concerned. In the case where two tires are deflated then a 0.6 bar pressure loss in each of the two tires caused a value of 1.0017 or 0.9983 to be generated.

Accordingly, the system is able to detect a puncture or relative deflation in a tire and more importantly detect and indicate which wheel or wheels are affected.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having described our invention what we claim is:

1. A method of detecting a deflated tire on a vehicle comprising the steps of:
   rotating tires of the vehicle, a front left-hand, a front right-hand, a rear left-hand and a rear right-hand wheel being provided;
   providing one wheel sensor for each of the tires;
   detecting angular velocity speed of the tires by the wheel sensors;
   calculating factors $$\frac{C1 + C2}{C3 + C4} \quad \frac{C1 + C3}{C2 + C4} \quad \frac{C1 + C4}{C2 + C3}$$

where C1, C2, C3 and C4 are signals for the speeds of the front left-hand, front right-hand, rear left-hand and rear right-hand wheels of the vehicle;
   monitoring the factors; and
   if the value of one or more factor becomes greater than 1.0005 or less than 0.9995, producing a warning signal to indicate that a tire has become at least partially deflated.

2. The method according to claim 1, wherein a warning signal is indicated when the value of the factors becomes greater than 1.001 or less than 0.999.

3. The method according to claim 1, wherein the warning signal is only given after the value of a factor is greater than 1.0005 or less than 0.9995 for two successive time periods.

4. The method according to claim 1, wherein the warning signal is only given after the value of a factor is greater than 1.0005 or less than 0.9995 for five successive time periods.

5. The method according to claim 1, wherein the comparison of the factors is by means of the Truth Table

| $\frac{C1 + C2}{C3 + C4}$ | $\frac{C1 + C3}{C2 + C4}$ | $\frac{C1 + C4}{C2 + C3}$ | Tire(s) Deflated |
|---|---|---|---|
| +ve | +ve | +ve | 1 |
| +ve | −ve | −ve | 2 |
| −ve | +ve | −ve | 3 |
| −ve | −ve | +ve | 4 |
| +ve | 0 | 0 | 1,2 |
| 0 | +ve | 0 | 1,3 |
| 0 | 0 | +ve | 1,4 |
| 0 | 0 | −ve | 2,3 |
| 0 | −ve | 0 | 2,4 |
| −ve | 0 | 0 | 3,4 |
| +ve | +ve | −ve | 1,2,3 |
| −ve | −ve | −ve | 2,3,4 |
| −ve | +ve | +ve | 3,4,1 |
| +ve | −ve | +ve | 4,1,2 | where +ve or −ve means that a factor is greater or less than the set values respectively and the tire or tires deflated are thus determined.

6. The method according to claim 1, wherein the signals for the speeds are corrected relative to one another based on constants derived from straight line running of the vehicle at a single speed.

7. The method according to claim 1, wherein the signals comprise multi-pulse electrical signals from each wheel, the signals also being useable for an anti-lock braking system.

8. The method according to claim 1, wherein the signals comprise a single electrical pulse for each rotation of each wheel and the time period between successive pulses is used for the angular velocity value.

* * * * *